(12) United States Patent
Raynesford et al.

(10) Patent No.: US 9,778,343 B2
(45) Date of Patent: Oct. 3, 2017

(54) SYSTEMS AND METHODS FOR LOCATING TAGS WITHIN A SPACE

(71) Applicants: Steven J. Raynesford, Mission Viejo, CA (US); David Gathright, Yorba Linda, CA (US)

(72) Inventors: Steven J. Raynesford, Mission Viejo, CA (US); David Gathright, Yorba Linda, CA (US)

(73) Assignee: Tyco Fire & Security GmbH, Neuhausen AM Rheinfall (CH)

( * ) Notice: Subject to any disclaimer, the term of this patent is extended or adjusted under 35 U.S.C. 154(b) by 174 days.

(21) Appl. No.: 14/740,383

(22) Filed: Jun. 16, 2015

(65) Prior Publication Data

US 2016/0370454 A1 Dec. 22, 2016

(51) Int. Cl.
*H04W 24/00* (2009.01)
*G01S 5/02* (2010.01)
*G06K 7/10* (2006.01)
*G01S 13/74* (2006.01)

(52) U.S. Cl.
CPC .............. *G01S 5/0252* (2013.01); *G01S 5/02* (2013.01); *G01S 5/021* (2013.01); *G06K 7/10366* (2013.01); *G01S 13/74* (2013.01)

(58) Field of Classification Search
CPC .................. G06K 7/10475; G06Q 10/087
See application file for complete search history.

(56) References Cited

U.S. PATENT DOCUMENTS

| 7,407,096 | B2 | 8/2008 | McQueen et al. |
|---|---|---|---|
| 7,639,138 | B2 | 12/2009 | Chang |
| 7,986,239 | B2 | 7/2011 | Chang |
| 8,629,773 | B2 | 1/2014 | Rhie et al. |
| 8,686,734 | B2 * | 4/2014 | Martin ............... H04N 7/181 324/501 |
| 8,727,225 | B2 | 5/2014 | Zumsteg et al. |

(Continued)

FOREIGN PATENT DOCUMENTS

WO          01/06401 A          1/2001

OTHER PUBLICATIONS

PCT International Search Report and Written Opinion of the International Searching Authority (EPO) for International Application No. PCT/US2016/037817 (dated Sep. 21, 2016).

*Primary Examiner* — Shahriar Behnamian
(74) *Attorney, Agent, or Firm* — Fox Rothschild LLP; Robert J. Sacco; Carol E. Thorstad-Forsyth (57) ABSTRACT

Systems (100) and methods (600) for determining a location of an object within space. The methods comprise: generating Inertial Reference Measurement Data ("IRMD"); reading RFID inventory tags by an RFID reader; processing IRMD to determine an RFID reader orientation and position estimates at a time of each RFID inventory tag read; defining cones associated with each RFID inventory tag; mapping the cones to a model; analyzing the model to identify a set of cones which overlap each other and are associated with reads for a respective RFID inventory tag; and deriving a position estimate for the respective inventory tag based on intersecting portions of the cones in the set of cones. Each cone has: a vertex which is the RFID reader position estimate at a respective time; and an angle which is in inverse proportion to a signal strength of a signal received from a respective RFID inventory tag.

20 Claims, 6 Drawing Sheets

(56) References Cited

U.S. PATENT DOCUMENTS

| | | |
|---|---|---|
| 8,797,141 B2 | 8/2014 | Best et al. |
| 2005/0246094 A1 | 11/2005 | Moscatiello |
| 2006/0092072 A1 | 5/2006 | Steiner |
| 2007/0140127 A1* | 6/2007 | Frei ............... H04J 3/0655 370/238 |
| 2010/0045436 A1 | 2/2010 | Rinkes |
| 2010/0109844 A1 | 5/2010 | Carrick et al. |
| 2010/0141385 A1* | 6/2010 | Shiau ............. H04B 5/0062 340/10.1 |
| 2010/0148985 A1 | 6/2010 | Lin et al. |
| 2010/0201488 A1 | 8/2010 | Stern et al. |
| 2010/0201520 A1 | 8/2010 | Stern et al. |
| 2012/0060738 A1* | 3/2012 | Sells ............... B63H 25/02 114/144 A |
| 2012/0290396 A1 | 11/2012 | Petrov |
| 2013/0169415 A1 | 7/2013 | Bellows |
| 2013/0249736 A1* | 9/2013 | Nikitin ............. G01S 5/02 342/450 |
| 2013/0278388 A1 | 10/2013 | Cristache |
| 2014/0361078 A1* | 12/2014 | Davidson ........ G06K 7/10356 235/385 |
| 2015/0239482 A1* | 8/2015 | Green ............. B61L 15/0063 246/122 R |

* cited by examiner

SYSTEMS AND METHODS FOR LOCATING TAGS WITHIN A SPACE

FIELD OF THE INVENTION

This document relates generally to wireless based systems. More particularly, this document relates to systems and methods for locating tags within a space.

BACKGROUND OF THE INVENTION

Existing beacon technology provides navigation and location reference points to assist a device in determining its own position or location. Beacons based on Infrared ("IR"), BlueTooth®, Wi-Fi access points, Global Positioning System ("GPS") satellites, Quick Response ("QR") codes, Ultra-WideBand ("UWB") time-of-flight and magnetic field contour maps are all used as known reference points to inform a device (such as a mobile phone) of its own location. Systems deriving fine-grid location with little or no reliance on GPS are commonly referred to as Location Based Services ("LBS") or Indoor Positioning Systems ("IPS"). These systems are used to infer location of other objects that are known to be nearby. For example, if a device is determined to be at position x, then an object that is known to be within a distance of y units of the located device is inferred to be within y units of position x. These systems require interaction with the device being located and are not suitable for integration with Radio Frequency Identification ("RFID") tags.

Triangulation techniques are used to determine the position of another object based on information collected by observations of the object from one or more known locations. Cellular triangulation, Wi-Fi triangulation, and various land survey techniques all collect information (such as direction to the object and/or signal strength from the object) from one or more reference positions and derive an approximation of that object's location. This requires having multiple observation points with known positions. The wider the area of unknown objects, the greater the number of observation points is needed to achieve a given accuracy.

Passive RFID is widely used for inventory assessment, providing an RFID reader with information about an RFID tag's presence but little in the way of the RFID tag's position beyond broad direction and signal strength information from which approximate locations might be inferred. Often, an RFID tag is read correctly but the derived direction and signal strength information are corrupt due to multi-path and antenna side-lobe distortions. The wide beamwidth of the RFID reader's antenna limits directional precision. The orientation of the RFID tag's antenna relative to the RFID reader's antenna has a similar influence on the Received Signal Strength Indicator ("RSSI") as distance has, i.e., a close RFID tag turned sideways to the RFID reader can have a lower returned signal than a distant RFID tag with a favorable orientation toward the RFID reader. This potential for distance inversion limits the value of RSSI in determining actual position of an RFID tag based on a single tag read.

Arrays of antennas with RFID readers provide finer resolution but scale poorly, are expensive, difficult to deploy and difficult to change. Use of beam-steered antennas such as the Impinj X-Array and Sensormatic IDSM-1000 and IDA-3100 can be configured to provide relative angle of the RFID tag to the antenna or RFID tag position/location at a chokepoint.

SUMMARY OF THE INVENTION

The present disclosure concerns implementing systems and methods for determining a location of an object within a space. The methods comprise: generating inertial reference measurement data by an Attitude and Heading Reference ("AHR") device that is useful for determining a position of an RFID reader within the space at each of a plurality of RFID tag read times; performing operations by the RFID reader to read a plurality of RFID inventory tags one or more times; processing the inertial reference measurement data to determine at least an RFID reader position estimate at times of each read of said RFID inventory tags; and defining a plurality of cones associated with each of said plurality of RFID inventory tags. Each cone has (a) a vertex which is the RFID reader position estimate at a respective time of the plurality of RFID tag read times, (b) an angle which is in inverse proportion to a signal strength of a signal received from a respective RFID inventory tag of the plurality of RFID inventory tags, and (c) an orientation which is the same as an orientation of the RFID reader antenna at the respective time of the plurality of RFID tag read times. The cones are then mapped to a model. The model may include, but is not limited to, a physical model, a mathematical model or a graphical model. The model is analyzed to identify at least one set of cones which overlap each other and are associated with reads for a respective RFID inventory tag of the plurality of RFID inventory tags. A position estimate is then derived for the respective inventory tag based on intersecting portions of the cones in the set of cones which was previously identified.

In some scenarios, the methods also involve: performing operations by the RFID reader to read at least one RFID locator tag one or more times; and correcting errors of the RFID reader position estimate using a known location of an RFID locator tag. Cones may be discarded which (a) do not overlap with at least one other cone in the model, (b) have an angle greater than a threshold value, or (c) do not overlap a cone associated with a strongest received signal strength.

In those or other scenarios, the position estimate derived for the respective inventory tag is refined using at least one pre-defined rule limiting a valid location for an object to which the respective inventory tag is attached. Additionally or alternatively, the RFID inventory tags are highly readable only from a preset and limited range of RFID reader positions and have weak or no response outside of that limited range.

DESCRIPTION OF THE DRAWINGS

Embodiments will be described with reference to the following drawing figures, in which like numerals represent like items throughout the figures, and in which.

DETAILED DESCRIPTION OF THE INVENTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns systems and methods for locating objects or items (e.g., RFID inventory tags) within a facility. The methods generally involve determining timely and accurate positions and locations of inventory in the facility while minimizing investment with new equipment, installation cost, and impact on the business owner's display of goods. The term "position", as used herein, refers to a specific coordinate within a reference system (such as an inventory space expressed as x, y and z coordinates). The term "location", as used herein, refers to a specific named position (e.g., to an entire shelf or rod, or to a station, space or room). Implementations of the novel methods do not require installation of cable, maintenance of powered devices, a strict path or pattern that a human operator must follow when using a handheld reader, and/or additional wireless locator devices which must be scanned by the handheld reader to determine RFID inventory tag locations within the facility.

As such, the systems comprise RFID locator tags, an AHR device attached to the handheld reader, and a Scalable Computation Platform ("SCP"). The RFID locator tags define a fixed reference system in a facility for determining locations of RFID inventory tags in a facility. Accordingly, the RFID locator tags are strategically located at fixed locations within the facility. For example, the RFID locator tags can be placed on each end of display equipment (e.g., a shelf). The SCP converts raw data into a database of positions and locations associated with each RFID inventory tag read by the handheld reader.

Notably, in some scenarios, the RFID locator tags comprise RFID inventory tags attached to pieces of inventory and having positions previously determined with values having a certain accuracy. These RFID inventory tags are subject to moving at any time, but are useful in the context of each inventory sweep.

The AHR device provides an inertial reference means for determining orientation and position of a handheld reader's antenna in a three dimensional space. In this regard, the AHR generates measurements of linear acceleration, rate of rotation and local magnetic field. The AHR device may also derive an absolute orientation thereof relative to a fixed frame-of-reference (e.g., an Earth based system of north-east-altitude). Absolute position may be derived from the measurement data, but drift can be severe due to the difficulty of separating Earth's gravitational acceleration from the relatively small accelerations of the AHR device's movements. Errors in the estimated positions of the AHR device's accumulating one hundred (100) feet of position error in ten (10) seconds are common. The position error comes from double-integration of errors in acceleration data so the position error grows exponentially with time. If corrections can be made at relatively short time intervals, the positional error can be limited. There are other methods of correcting the initial position estimates, including gait measurement. There are additional corrections proposed below based on reference RFID location tags.

Processing of the data uses the observations of the known position reference RFID locator tags to correct the initial position estimates generated by the SCP. The corrected position estimates are used to determine the position and/or location of other RFID inventory tags read during the same inventory scan. This position and/or location information is useful for many purposes. For example, the location information can be used to micro-locate items during an inventory process. Knowing accurate locations of items within a facility would be a tremendous feature for warehouse, retailer, hospitals and other applications where tracking items or persons is needed. For example, employee and/or equipment tracking can be achieved by (a) employing a wearable or attached RFID reader and (b) using proximity to RFID locator tags and RFID inventory tags as a proxy for an actual location of the employee or equipment.

Exemplary Systems

Figure 1:
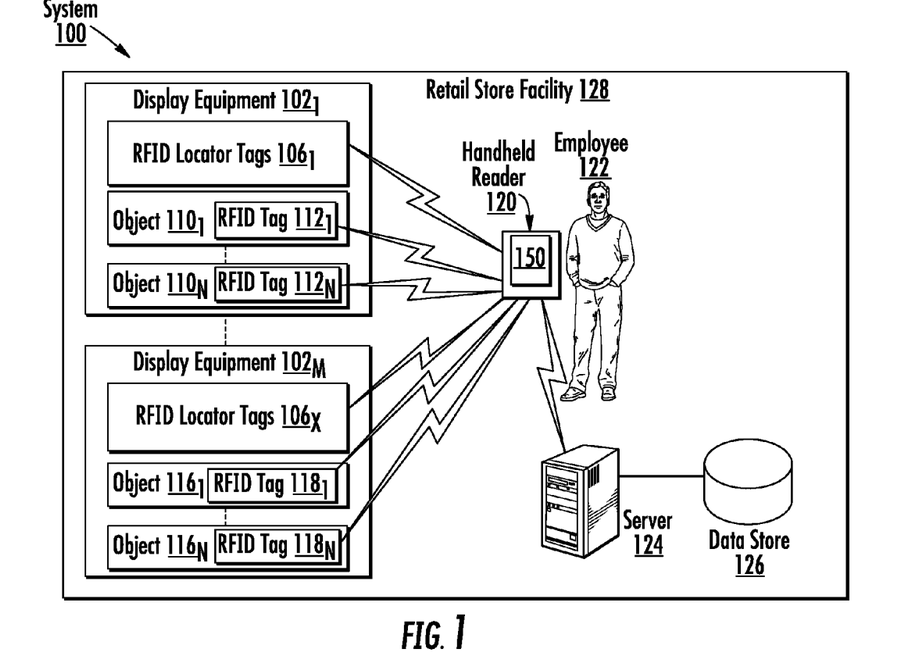
FIG. 1 is a schematic illustration of an exemplary system that is useful for understanding the present invention.

Referring now to FIG. 1, there is provided a schematic illustration of an exemplary system 100 that is useful for understanding the present invention. The present invention is described herein in relation to a retail store environment. The present invention is not limited in this regard, and can be used in other environments. For example, the present invention can be used in distribution centers, factories and other commercial environments. Notably, the present invention can be employed in any environment in which objects and/or items need to be located and/or tracked.

The system 100 is generally configured to allow improved object locating within a facility using RFID and sensor technologies. As shown in FIG. 1, system 100 comprises a Retail Store Facility ("RSF") 128 in which display equipment $102_1$-$102_M$ is disposed. The display equipment is provided for displaying objects (or items) $110_1$-$110_N$, $116_1$-$116_N$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

RFID locator tags $106_1, \ldots, 106_X$ are located at strategic locations within the RSF 128 and are oriented so as to be easily read. In some scenarios, the RFID locator tags are disposed on display equipment $102_1$-$102_M$ (as shown in FIG. 1) in a manner that prevents unintended movement thereof. Additionally or alternatively, the RFID locator tags are disposed on emergency equipment, checkout counters, walls, ceilings, and/or EAS system equipment (e.g., pedestals near and entrance/exit of the RSF). RFID locator tags are well known in the art, and therefore will not be described herein. Still, it should be understood that the RFID locator tags are generally configured to facilitate a periodic or continuous determination of locations of the objects within the RSF 128.

Each RFID locator tag $106_1, \ldots, 106_X$ has a unique locator ID associated therewith. When the handheld reader 120 reads an RFID locator tag, it obtains the unique locator ID therefrom. The unique locator IDs are then used to obtain information specifying known locations of the RFID locator tags. In this regard, it should be understood that information that specifies the known locations of the RFID locator tags in three dimensional space is stored in a data store 126, may be encoded n the unique locator ID, or may be stored in another location in the tag memory. This information can be stored in the data store 126 using a server 124 and/or a memory of the handheld reader. Server 124 will be described in more detail below in relation to FIG. 3. Still, it should be understood that server 124 and/or handheld reader (is)are configured to perform operations for: determining position estimates for the handheld reader within the facility at a plurality of RFID inventory tag read times; and using these determined position estimates to derive the positions and/or locations of the RFID inventory tags $112_1, \ldots, 112_N$, $118_1, \ldots, 118_N$ within the facility. The known locations of the RFID locator tags are used to correct errors in position estimates determined for the handheld reader.

The RFID locator tags $106_1, \ldots, 106_X$ may also have a known angular electromagnetic response pattern to the handheld reader 120. Additional information may also be pre-coded on each RFID locator tag $106_1, \ldots, 106_X$. The additional information can include, but is not limited to, a notation that an RFID tag is an RFID locator tag, a position of the RFID locator tag within an inventory space, and/or a location of the RFID locator tag within an inventory space. The term "inventory space", as used herein, refers to a final frame of reference of RFID inventory tag location information. An inventory space may have limits or constraints to define the extent of the RFID inventory tags kept in an inventory (e.g., the walls of a store excludes RFID inventory tags in an adjacent store).

The RFID inventory tags and RFID locator tags are described herein as comprising single-technology tags that are only RFID enabled. The present invention is not limited in this regard. The RFID inventory and locator tags can alternatively or additionally comprise dual-technology tags that have both EAS and RFID capabilities. Additionally, the RFID inventory tags and RFID locator tags can be passive or active devices.

While the handheld reader 120 scans the RSF 128, it records certain information in an internal memory (not shown in FIG. 1) and/or an external data store 126 along with timestamps. This information includes, but is not limited to, data from each RFID inventory tag read, the parameters controlling the RFID inventory tag read, measurement values relating to the read process, and AHR device measurement data (also referred to herein as "inertial reference measurement data"). The AHR measurement data is obtained by an AHR device 150 attached to the handheld reader 120. The AHR device 150 is attached to the handheld reader 120 such that there is no relative motion between the handheld reader's antenna (not shown in FIG. 1) and the AHR device 150 during tag scanning or reading operations. The AHR measurement data includes acceleration measurement data, rotation measurement data and magnetic field measurement data. The AHR measurement data is collected at each point that data is read from each RFID inventory tag $112_1, \ldots, 112_N$, $118_1, \ldots, 118_N$ and/or RFID locator tag $106_1, \ldots, 106_X$. During an inventory scan, one or more observations of each RFID tag $106_1, \ldots, 106_X$, $112_1, \ldots, 112_N$, $118_1, \ldots, 118_N$ in an inventory space are made and recorded. Due to the sweeping nature of scanning with the handheld reader 120, each observation is made from a unique position and orientation of the handheld reader 120.

When the inventory scan is finished, the data collected is processed to derive the position and location of each of the RFID inventory tags $112_1, \ldots, 112_N$, $118_1, \ldots, 118_N$ in the inventory space. Data from the AHR device's observations is used to derive an initial estimate of path (sequence of positions) and orientations of the handheld reader 120. The initial or corrected position of the handheld reader 120 can then be interpolated to know its position and orientation at each read of an RFID inventory tag $112_1, \ldots, 112_N$, $118_1, \ldots, 118_N$. The position of the RFID inventory tag $112_1, \ldots, 112_N$, $118_1, \ldots, 118_N$ may then be estimated based on the estimated position of the handheld reader 120 at the time of each read in combination with the data recorded with that observation of the RFID inventory tag $112_1, \ldots, 112_N$, $118_1, \ldots, 118_N$ (e.g., the time, the decoded tag data, the Received Signal Strength Indicator ("RSSI"), the RF power, the RF frequency, antenna polarity, beam width, orientation, the position of the handheld reader, the position of the handheld reader's antenna are used to determine an estimate of the RFID tag's position).

The processing of data may be iterative and adaptive. In an iterative process, the first pass through the observed data constructs a model of RFID tag and handheld reader positions during the scan through the inventory space. Subsequent scans use this model as a starting point to improve the estimates of all positions of a minimum-energy or entropy model using simulated annealing, physics modeling, or other iterative system solver.

Figure 2:
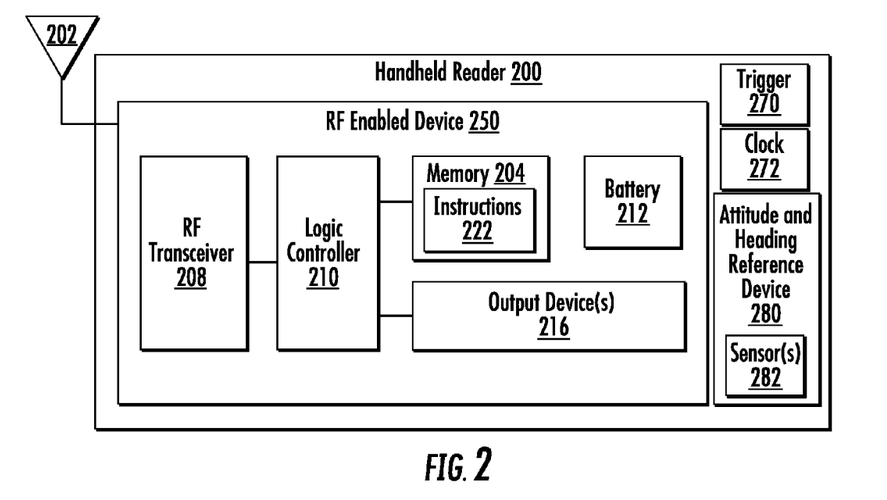
FIG. 2 is a block diagram of an exemplary architecture for a handheld reader.

Referring now to FIG. 2, there is provided a detailed block diagram of an exemplary architecture for a handheld reader 200. Handheld reader 120 of FIG. 1 is the same as or similar to handheld reader 200. As such, the discussion of handheld reader 200 is sufficient for understanding handheld reader 120.

Handheld reader 200 may include more or less components that that shown in FIG. 2. However, the components shown are sufficient to disclose an illustrative embodiment implementing the present invention. Some or all of the components of the handheld reader 200 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an embodiment of a representative handheld reader 200 configured to facilitate improved object locating within an RSF (e.g., RSF 128 of FIG. 1). In this regard, the handheld reader 200 comprises an RF enabled device 250 for allowing data to be exchanged with an external device (e.g., RFID locator tags $106_1, \ldots, 106_X$ and/or RFID inventory tags $112_1, \ldots, 112_N, 118_1, \ldots, 118_N$ of FIG. 1) via RF technology. The components 204-216 shown in FIG. 2 may be collectively referred to herein as the RF enabled device 250, and include a power source 212 (e.g., a battery).

The RF enabled device 250 comprises an antenna 202 for allowing data to be exchanged with the external device via RF technology (e.g., RFID technology or other RF based technology). The external device may comprise RFID locator tags $106_1, \ldots, 106_X$ of FIG. 1 and/or RFID inventory tags $112_1, \ldots, 112_N, 118_1, \ldots, 118_N$ of FIG. 1. In this case, the antenna 202 is configured to transmit RF carrier signals (e.g., interrogation signals) to the listed external devices, and/or transmit data response signals (e.g., authentication reply signals) generated by the RF enabled device 250. In this regard, the RF enabled device 250 comprises an RF transceiver 208. RFID transceivers are well known in the art, and therefore will not be described herein. However, it should be understood that the RF transceiver 208 receives RF signals including information from the transmitting device, and forwards the same to a logic controller 210 for extracting the information therefrom.

Notably, memory 204 may be a volatile memory and/or a non-volatile memory. For example, the memory 204 can include, but is not limited to, a Random Access Memory ("RAM"), a Dynamic Random Access Memory ("DRAM"), a Static Random Access Memory ("SRAM"), a Read-Only Memory ("ROM") and/or a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 222 are stored in memory for execution by the RF enabled device 250 and that cause the RF enabled device 250 to perform any one or more of the methodologies of the present disclosure. The instructions 222 are generally operative to facilitate determinations as to where RFID inventory tags are located within a facility. Other functions of the RF enabled device 250 will become apparent as the discussion progresses.

An AHR device 280 is attached to the handheld reader 200. AHR device 150 of FIG. 1 can be the same as or similar to AHR device 280. As such, the discussion of AHR device 208 is sufficient for understanding AHR device 150. AHR device 280 includes one or more quantizing sensors 282 of phenomenon such as magnetic field, acceleration and rotation. The AHR device 280 is configured to process the sensor data so as to obtain a position and orientation within a frame of reference. The term "frame of reference" or "reference frame", as used herein, refers to any consistent coordinate system that may be transformed to another coordinate system.

The extracted information can be used to determine the location of RFID inventory tags (e.g., RFID inventory tags $112_1, \ldots, 112_N, 118_1, \ldots, 118_N$ of FIG. 1) within a facility (e.g., RSF 128 of FIG. 1). In this regard, the extracted information includes the RFID data from the RF enabled device 250 and the AHR and clock information in the handheld reader 200. Accordingly, the logic controller 210 can store the extracted information in memory 204, and execute algorithms using the extracted information. For example, the logic controller 210 can perform correlate RFID inventory tag reads with RFID locator tag reads to determine the location of the RFID inventory tags within the facility.

Output devices 216 generally provide a means for output information to a user of the handheld reader 200. For example, the output devices 216 include a display on which graphics are displayed directing the user to a location that needs better scanning or to a location where a specific item is located. Also, maps may be presented to the user via the display. The maps may include a three dimensional map showing the estimated positions of the RFID inventory tags within a virtual facility, and/or a heat map overlaid on an image inventory space showing the uncertainty of RFID inventory tag positions. Additionally or alternatively, the output devices 216 include means for revealing well-scanned areas of a facility, poorly scanned areas of a facility and/or missing scanned areas of a facility. Employee effectiveness in scanning can be derived from the quality of the scanned data relative to the aggregated data of all employees' scans.

Figure 3:
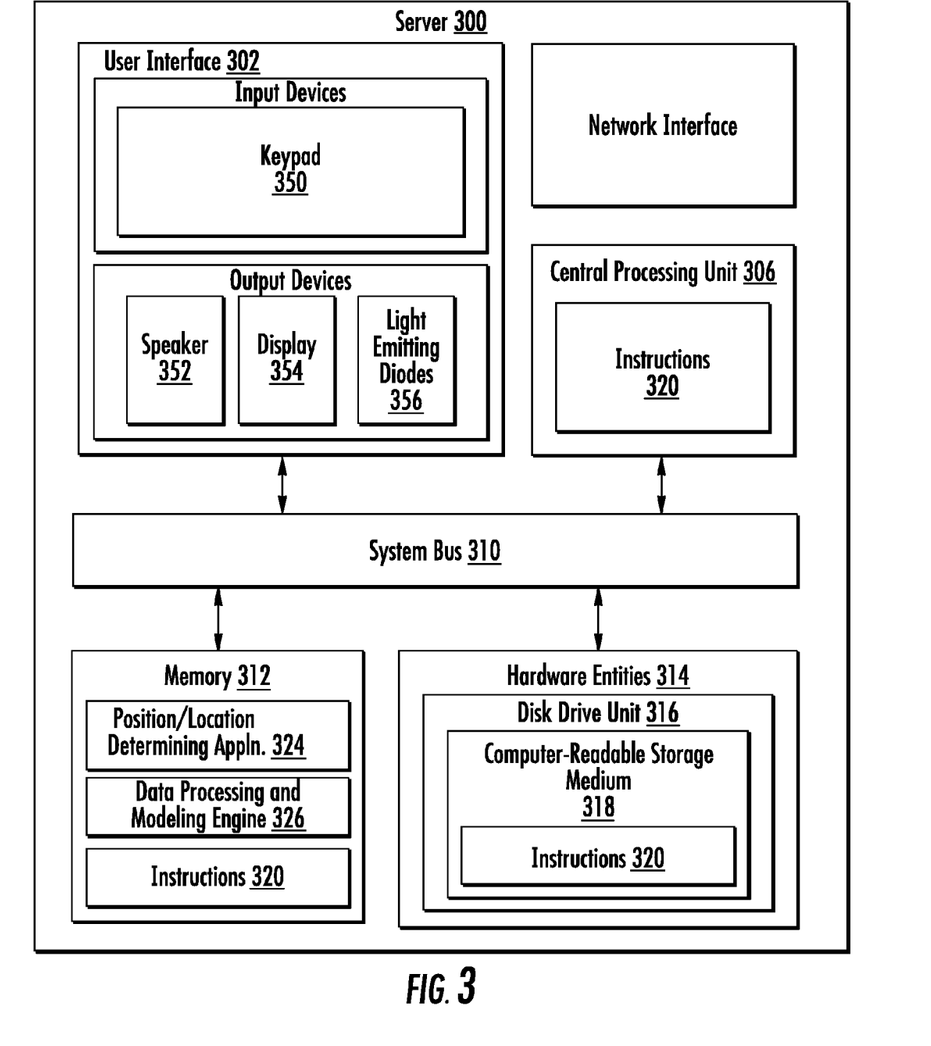
FIG. 3 is a block diagram of an exemplary architecture for a server.

Referring now to FIG. 3, there is provided a detailed block diagram of an exemplary architecture for a server 300. Server 124 of FIG. 1 is the same as or substantially similar to server 300. As such, the following discussion of server 300 is sufficient for understanding server 124.

Notably, the server 300 may include more or less components than those shown in FIG. 3. However, the components shown are sufficient to disclose an illustrative embodiment implementing the present invention. The hardware architecture of FIG. 3 represents one embodiment of a representative server configured to facilitate (a) the determination of positions and locations of RFID inventory tags within a facility and/or (b) the provision of a three dimensional map showing locations of RFID inventory tags (e.g., RFID tags $112_1, \ldots, 112_N, 118_1, \ldots, 118_N$ of FIG. 1) within an RSF (e.g., RSF 128 of FIG. 1). As such, the server 300 of FIG. 3 implements at least a portion of a method for providing such RIFD inventory tag positions and locations in accordance with embodiments of the present invention.

Some or all the components of the server 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the server 300 comprises a user interface 302, a Central Processing Unit ("CPU") 306, a system bus 310, a memory 312 connected to and accessible by other portions of server 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the server 300.

At least some of the hardware entities 314 perform actions involving access to and use of memory 312, which can be a Random Access Memory ("RAM"), a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the server 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the server 300 and that cause the server 300 to perform any one or more of the methodologies of the present disclosure.

In some embodiments of the present invention, the hardware entities 314 include an electronic circuit (e.g., a processor) programmed for facilitating (a) determinations of positions and locations of RFID inventory tags within a facility and/or (b) the provision of a three dimensional map showing positions and/or locations of RFID inventory tags within a facility. In this regard, it should be understood that the electronic circuit can access and run a position/location determining application 324 installed on the server 300. The software application 324 is generally operative to facilitate: the determination of RFID inventory tag positions and/or locations within a facility; and the mapping of the RFID inventory tag locations in a virtual three dimensional space. Other functions of the software application 324 will become apparent as the discussion progresses.

The server 300 also comprises a Data Processing and Modeling Engine ("DPME") 326. The DPME is generally configured to determine: estimates of the handheld reader's positions and locations; and estimates of the RFID inventory tags' positions and locations. In this regard, the DPME performs the following operations: estimating a course and position of the handheld reader (e.g., handheld reader 200 of FIG. 2) and AHRD device (e.g., AHRD device 280 of FIG. 2) at each read time defined by timestamps; using data of each read of an RFID inventory tag to define a cone; place the cones in a three dimensional physical, graphical or mathematical model; and determine estimates of the positions and locations of the RFID inventory tags based on overlapping cones associated therewith. Physical, graphical and mathematical modeling is well known in the art, and therefore will not be described in detail herein.

The course, position and location of the handheld reader and AHRD device (e.g., AHRD device 280 of FIG. 2) are derived using inertial navigation and known locations of RFID locator tags read by the handheld reader. Inertial navigation is well known in the art, and therefore will not be described in detail herein. In some scenarios, the position and orientation of the handheld reader is constrained by practical maximum translation and rotational velocities.

These constraints may be defined as additional relationships between entities in a physical or graphical model. For example, the constraints may include hard stops or non-linear spring forcings when mapped into a physical model. Notably, refinement of the precision or accuracy of the position and/or location estimate of any RFID inventory tag may be used to refine positions and/or locations of the handheld reader.

Relative signal strengths of co-located horizontally-polarized RFID locator tags and vertically-polarized RFID locator tags serve as an indication of roll of the handheld reader. This information may be used, for example, as an additional input to an estimation system such as a Kalman filter. Compensation of relative signals strengths read from each RFID locator tag by the handheld reader under ideal conditions may be needed.

Figure 4:
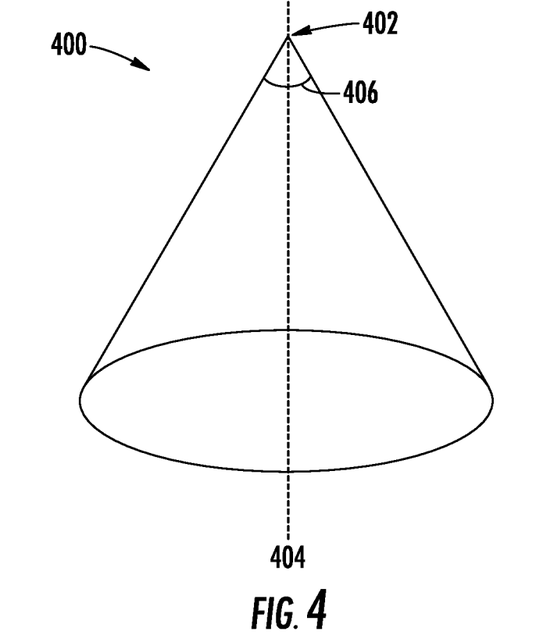
FIG. 4 is a schematic illustration of an exemplary cone.

Referring now to FIG. 4, there is provided a schematic illustration that is useful for understanding how RFID inventory tag positions and locations are determined by a system (e.g., system 100 of FIG. 1). Data recorded at each read of an RFID inventory tag (e.g., RFID inventory tags $112_1, \ldots, 112_N, 118_1, \ldots, 118_N$ of FIG. 1) is used to define a cone 400. The RFID inventory tag is presumed likely to be found inside the bounds of the cone 400. The vertex 402 of the cone 400 is the estimated position of the handheld reader (e.g., handheld reader 120 of FIG. 1) at the time of the RFID inventory tag read. The axis 404 of the cone 400 is in line with the estimated orientation of the handheld reader at the time of the RFID inventory tag read. The angle 406 of the cone 400 is defined in inverse proportion to the RSSI recorded for the RFID inventory tag at that read with possible modification by the RFID reader antenna directional gain and/or tag directional sensitivity. Angle 406 is smaller when the RSSI is high, and larger when the RSSI is low. RSSI is affected by several factors: distance between the RFID reader and the tag; RFID reader transmit power; and orientation of the tag to the RFID reader antenna. For example, a nearby tag turned sideways to an RFID reader can respond with a lower RSSI than a more distant tag aligned broadside to the RFID reader. Colloquially, the broadside tag presents a larger area to the RFID reader antenna.

The set of RFID inventory tag reads are ranked by the RSSIs associated therewith. The RFID inventory tag read with the highest RSSI maps to a cone with a narrow angle (essentially defining a straight line on which the RFID inventory tag is expected to lie). Data from additional RFID inventory tag reads define cones with widths inversely proportional to the RSSIs related to the strongest signal for that RFID inventory tag. Data may be discarded for an RFID inventory tag read that is substantially below the strongest RSSI values for other reads of the same RFID inventory tag.

Figure 5:
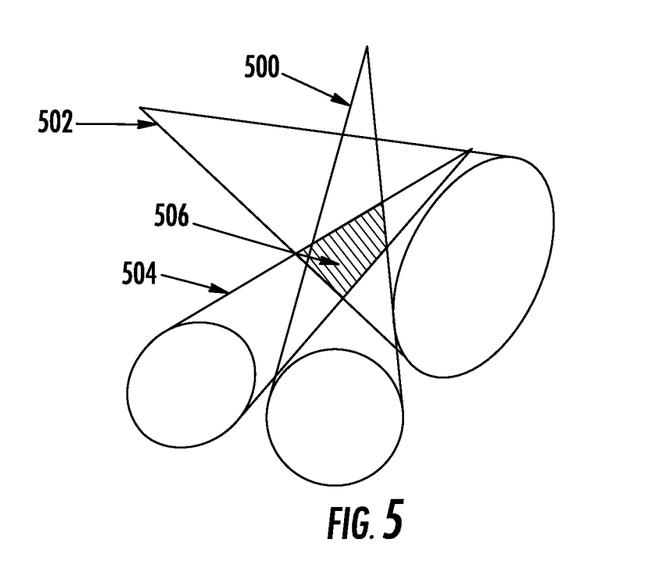
FIG. 5 is a schematic illustration showing an intersection of three cones that narrows the possible location of an RFID inventory tag.

Data from each read of the same RFID inventory tag produces a plurality of cones 500, 502, 504 with different attributes. Each of the cones 500-504 is likely to contain the position of the RFID inventory tag. The intersection of these cones 500-504 narrows the possible location of the RFID inventory tag, as shown in FIG. 5. The estimated position of an RFID inventory tags is determined to be within intersection area 506.

All of the cones of estimated positions of each RFID inventory tag are inter-linked by segments of the estimated path and orientation of the handheld reader (e.g., handheld reader 120 of FIG. 1). Certain points of the system (e.g., system 100 of FIG. 1) are well-known, including the position of each RFID locator tag and are considered fixed. Other fixed positions could be the starting point of the handheld reader. Other positions defined by the system are partially constrained to the inventory space reference frame or constrained to be within a distance or angular range of another point.

In some scenarios, a minimum number of cones are used to determine the position of the RFID locator tag no matter how poor the intersection angle is. In other scenarios, only cones with intersection angles close to ninety degrees (90°) are used to determine the position of the RFID locator tag. Accordingly, cones with a small axis angle of intersection to and cones that do not intersect the cone with the strongest RSSI are ignored or rejected, i.e., not used to determine the position of the RFID locator tag.

Refinement of the width of the cone of probable position determined by one read of an RFID inventory tag may be made based on the intersection of that cone with the cone of another read of the same RFID inventory tag. For each RFID inventory tag, the further the estimated intersection from the handheld reader's position, the narrower the estimated cone of position may be. This adjusts the cone widths based on the distinction between low RSSI due to distance from the handheld reader's antenna vs low RSSI due to reading off-axis from the handheld reader's antenna.

As noted above, the estimated positions of the RFID inventory tags are then mapped to a physical model, a graphical model and/or a mathematical mode. Each of these types of models is well known in the art, and therefore will not be described in detail herein. Still, a few examples are provided below for a physical model scenario and a graphical model scenario.

Physical Modeling Approach

Mapping of most-likely inventory position problem to a constrained physical body problem allows extraction of position information from physics model solution. The result after all reads are mapped is an articulated rigid-body model that will start with various elements in tension and through iteration will be reduced to a configuration that has the minimum energy (as defined by stops and spring constants). The position of each tag is then available from the physical model.

To use a physical model (these are virtual mappings of RFID inventory tag read parameters into a physical model), the following is implemented:

Each observation of an RFID inventory tag is modeled as a body having the position and orientation of the handheld reader's antenna at the time of the read in the reference frame. The observation bodies are linked together according to the time-ordered sequence of the reads and are constrained in position and orientation according to the estimate of the position and orientation between the consecutive reads.

RFID locator tags have a known position and have additional constraints in that they are fixed within the reference frame, i.e. their positions are not adjusted during the optimization. The anchor effect of their fixed positions is one of the strongest influences on the final solution.

Each read of an RFID inventory tag has data that defines linkages between the position and orientation of the handheld reader's antenna at the time of that read and the tag body.

One linkage is a sliding linkage with constraints fixing one end of the slide range at the handheld reader's antenna and another constraint at the maximum reasonable read range (e.g., ten meters). The probable location of the RFID inventory tag for that read is defined as the end of the slider opposite the end at the reader antenna.

A second constraint defined by the tag read, in series with the sliding linkage, is a ball-socket joint positioned at the handheld reader's body. The ball-socket constraint may be a combination of hard angular limit and a spring constant forcing to the centerline of the read as defined by the orientation of the handheld reader's body. Limits and spring constants are proportional to the RSSI value of the read, the handheld reader's antenna beam width and other factors. This allows the sliding linkage to rotate around the handheld reader's antenna center axis, defining the aforementioned cone of probable position.

Each RFID inventory tag is modeled as a body, with constraining linkages to the physical embodiment of each of the reads of that RFID inventory tag. The position of each tag body is constrained by each read of that RFID inventory tag by defining a sliding joint for each read with spring constant forcing to minimum length, and with one attachment of the slider to the tag's body and the other end to the end of each slider defined by each read of that RFID inventory tag. The spring constant forcing may be controlled by RSSI and other estimates of the quality of the particular read.

Each position of the handheld reader is constrained by the initial measurements of the AHRS and by the known-positions of the RFID locator tags. Observations of the RFID locator tags provide strong constraints on the adjustment of the initial observation path. The handheld reader may be further constrained by docking at a fixed location to reference the AHRS, passing through a portal with known coordinates, reading one or more RFID inventory or locator tags from a known position and orientation, constrained by aisles and corridors, etc.

In some scenarios, a physical modeling engine is used to perform iterative adjustments of relative RFID inventory tag positions into a most-likely solution. For simulation convergence, the following parameters are defined to minimize oscillations: masses; spring constants; and viscosities/frictions.

Graphical Modeling Approach

In some scenarios, the most-likely RFID inventory tag positions are mapped to a graphical model of an inventory space. The uncertainty of the RFID inventory tag positions is iteratively reduced according to an optimization algorithm. The optimization algorithm can include, but is not limited to, a Simulated Annealing ("SA") heuristic algorithm. SA heuristic algorithms are well known in the art, and therefore will not be described herein. Still, it should be understood that the SA heuristic algorithm defines constraints as mathematical relationships. The system is optimized for a minimum as defined by the constraints, where the minimum indicates the best fit of RFID inventory tag positions to the data collected.

Additionally, a newly estimated positon of an RFID inventory tag or handheld reader may be constrained using a previously determined position thereof. The forcing strength may be linear or exponentially decay with distance between the previous position and a newly estimated position.

Additional Rules

In all modeling scenarios, additional rules can be used to refine the position estimates for the RFID inventory tags. The rules can be used to refine the position and location estimates of the RFID inventory tags determined during a modeling process. Alternatively or additionally, the rules can be used during the modeling process to determine the position and location estimates for the RFID inventory tags. The rules may limit valid locations for specific objects (to which RFID inventory tags are attached) based on contents of an inventory storage system. For example, an object (e.g., a piece of clothing) typically hangs from a rod or sits on a shelf. However, the position and/or location determined for the corresponding RFID inventory tag indicates that the object is floating in the middle of a known aisle. In this case, a rule is used to refine the initial and/or final estimates of position and/or location of the RFID inventory tag by removing invalid positions and locations from the position estimate, i.e., by removing the positon and/or location information indicating that the object is floating in the middle of the known aisle. The RFID inventory tag's position must ultimately resolve to a valid location or be rejected. Such rules improve rejection of multi-path reads, antenna side-lobe reads, and/or RFID inventory tag moving and read in two locations.

The rules also provide a means to position an RFID inventory tag close to a physical constraint in a reference frame. This allows more accuracy in locating the RFID inventory tag. For example, the rules ensure that an RFID inventory tag is placed as close to a hanger-hook as possible since the hanger-hook is placed on a rod that has a fixed position within the reference frame.

In some scenarios, processing of tag read data is done in separate steps to improve convergence. For example, a first step uses tag read data for RFID locator tags alone to correct the handheld reader's path and orientation. Successive steps estimate the positions and/or locations of RFID inventory tags in groups. A final step checks or fine-tunes of the results.

Processing of tag read data for determining the positions and/or locations of RFID inventory tags may be performed as it is received. Deriving the position of an RFID inventory tag requires one or more reads of that RFID inventory tag coupled with one or more reads of an RFID locator tag. Once the minimum information is available for an individual RFID inventory tag, an estimate of its position may be made and stored. As additional scanning is performed, the estimated position of some RFID inventory tags may be improved and the first estimated positions of additional RFID inventory tags may be derived.

Calibration Technique

In some scenarios, a calibration technique is employed to ensure that only relatively narrow cones are generated for certain location tags. The calibration technique develops a highly directional reference tag set. Let's consider the case where multiple RFID location tags exist in very close proximity. Each RFID location tag has a unique id. Each RFID location tag is readable in only a narrow beamwidth, regardless of beamwidth of handheld reader's antenna. This concept associates a known angular pattern in addition to the known-location of the RFID locator tags for use in calibration and/or correction of other tag data. Isolation between sectors need only be sufficient to clearly distinguish stronger/weaker tag responses. Because these RFID locator tags are closely spaced, RSSI effectively distinguishes the most direct-path tag.

In some case, vertical dipole RFID inventory tags may be arrayed around a vertical axis with field absorbing separators segmenting the field of view of each RFID inventory tag. A similar arrangement could be done with horizontal RFID inventory tags about a horizontal axis. In other cases, a limited directionality is found in a crossed dipole. Each dipole terminates in a separate RFID tag Integrated Circuit ("IC"). RFID inventory and locator tags are aligned as chords along the circumference of a circle. These RFID inventory and locator tags will have varying RSSI to a handheld reader from a distance. The center of the circle can be derived from the combined tag responses. In yet other cases, one or more tags with planar-printed directional (e.g., a Yagi) can be fixed to non-conductive surfaces.

Although the present invention has been described above in relation to a handheld reader carried by a person through a facility, the present invention is not limited in this regard. For example, additionally or alternatively, an Automated and Autonomous Rolling ("AAR") platform is employed for carrying an RFID reader through the facility. The AAR platform follows a prescribed path and uses a simple mechanism to sweep the RFID reader. The translational part of an inertial reference system could in part be replaced with odometer type motion sensing system mounted on the AAR platform with absolute angle references built into the sweeping mechanism, referenced to the floor-referenced platform. This AAR platform based system would possibly only operate during store-closed hours. Larger battery and longer and more thorough scans are possible, with consistency unmatched by human operators. Antenna gain and pattern can be optimized to micro-location.

Figure 6A:
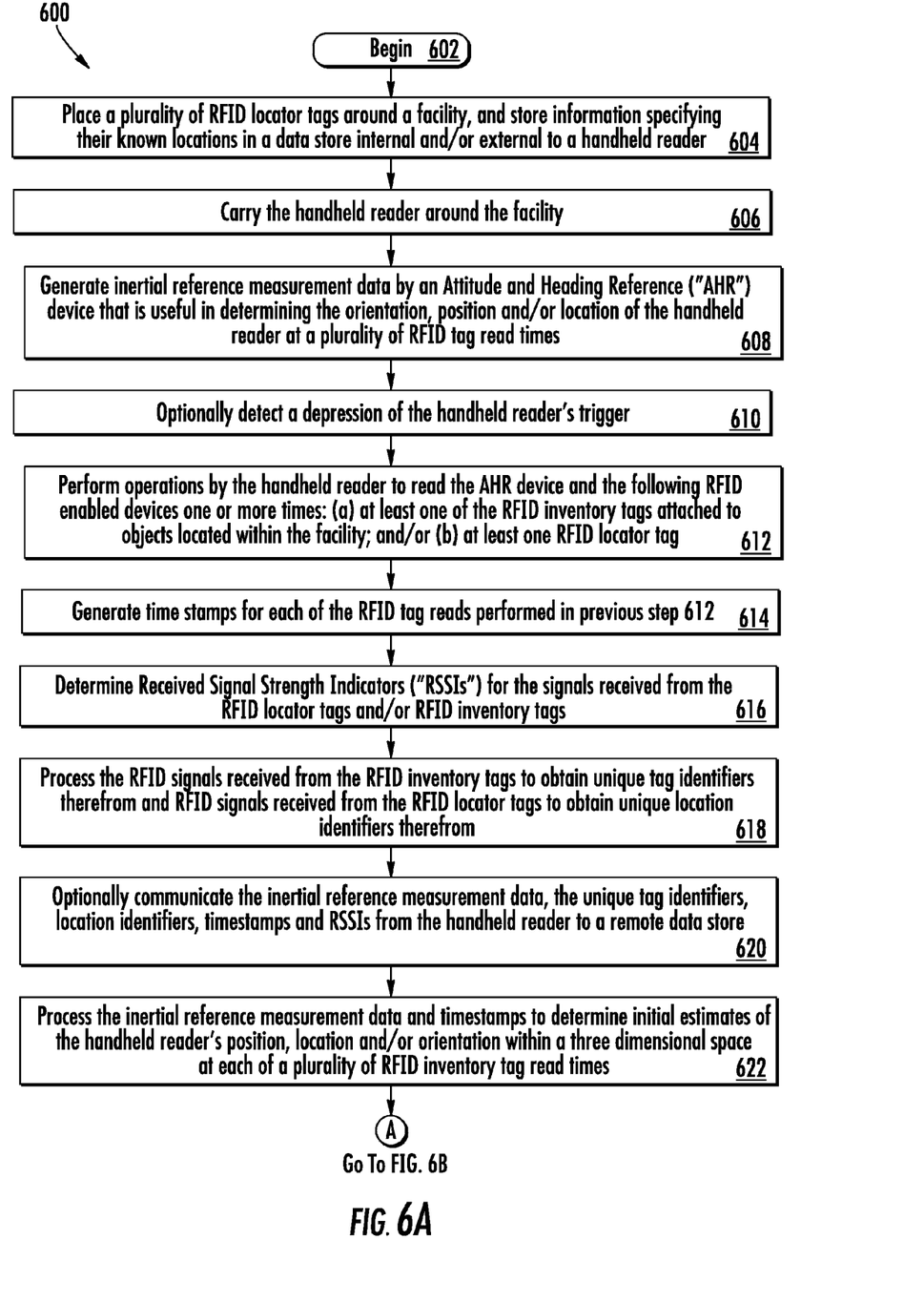
FIGS. 6A-6B (collectively referred to herein as "FIG. 6") provide a flow diagram of an exemplary method for determining positons and/or locations of RFID inventory tags within an inventory space.
Figure 6B:
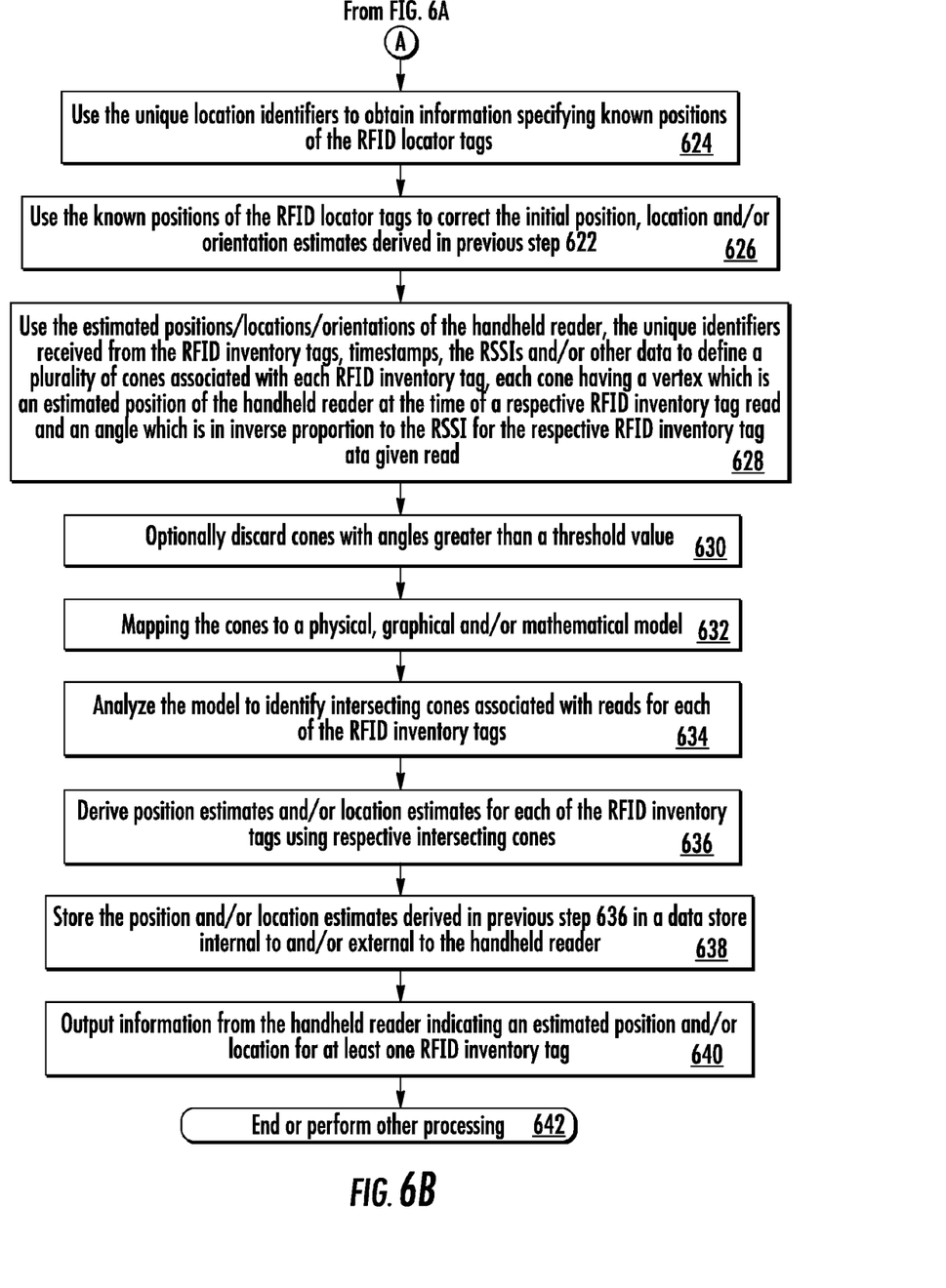

Exemplary Methods for Determining Positions and/or Locations of RFID Inventory Tags in a Facility Referring now to FIGS. 6A-6B, there is provided a flow diagram of an exemplary method 600 for determining positions and/or locations of RFID inventory tags within an inventory space. Method 600 begins with step 602 and continues with step 604 where a plurality of RFID locator tags (e.g., RFID locator tags $106_1, \ldots, 106_X$ of FIG. 1) are placed around a facility (e.g., RSF 128 of FIG. 1). Information is stored specifying the RFID locator tags' known locations. The information is stored in a data store (e.g., data store 126 of FIG. 1 and/or memory 204 of FIG. 2) internal to an RFID handheld reader (e.g., handheld reader 120 of FIG. 1 or 200 of FIG. 2) and/or external to the handheld reader.

In a next step 606, the handheld reader is carried around the facility. The handheld reader can be carried by a person (e.g., employee 122 of FIG. 1) or a mobile device (e.g., an unmanned vehicle). As the handheld reader is carried through the facility, step 608 is performed in which an AHR device (e.g., an AHR device 150 of FIG. 1 or 280 of FIG. 2) generates inertial reference measurement data. The inertial reference measurement data is useful for determining the handheld reader's orientation, position, and/or location at a plurality of RFID tag read times. The inertial reference measurement data is also useful in determining a path through the facility.

Next in optional step 610, depression of the handheld reader's trigger is detected. In response to such detection, steps 612-618 are performed. In some scenarios, steps 612-618 are performed sequentially at each tag read and completed before starting a next tag read. Step 612 involves performing operations by the handheld reader to read the AHR device, as well as the following RFID enabled device one or more times: (a) a plurality of RFID inventory tags (e.g., RFID inventory tags $112_1, \ldots, 112_N, 118_1, \ldots, 118_N$ of FIG. 1) attached to a plurality of objects (e.g., objects $110_1, \ldots, 110_N, 116_1, \ldots, 116_N$ of FIG. 1) within a facility; and/or (b) at least one RFID locator tag (e.g., RFID locator tag $106_1, \ldots, 106_N$ of FIG. 1). Steps 614-616 involve: generating timestamps for each of the RFID tag reads performed in step 612; and determining RSSIs for the signals received from the RFID locator tags and/or RFID inventory tags.

Upon completing steps 612-616, step 618 is performed where the RFID signals received from the RFID inventory tags are processed to obtain unique tag identifiers therefrom. Similarly, the RFID signals received from the RFID locator tags are processed to obtain unique location identifiers therefrom. The inertial reference measurement data, the unique tag identifiers, location identifiers, timestamps and RSSIs are optionally communicated from the handheld reader to a remote data store.

In next step 622, initial estimates are determined for the handheld reader's position, location and/or orientation within a three dimensional space at each of a plurality of RFID inventory tag read times. The initial estimates are determined by processing the inertial reference measurement data and timestamps. After completing step 622, method 600 continues with step 624 of FIG. 6B.

Referring now to FIG. 6B, step 624 involves using the unique location identifiers to obtain information specifying known positions of the RFID locator tags. The known positions of the RFID locator tags are used in step 626 to correct the initial position, location and/or orientation estimates derived in previous step 622. The estimates positions/locations/orientations of the handheld reader are then used in step 628 to define a plurality of cones. Additionally, the following information is used to define the cones: the unique tag identifiers received from the RFID inventory tags; timestamps; the RSSIs; and/or other data. Each cone has a vertex which is an estimated position of the handheld reader at the time of the respective RFID inventory tag read and an angle which is in inverse proportion to the RSSI for the respective RFID inventory tag at a given read. Some of the cones may be discarded in step 630. For example, cones with angles greater than a threshold value may be discarded.

The cones are then mapped to a physical, graphical and/or mathematical model, as shown by step 632. The map is analyzed in step 634 to identify intersecting cones associated with reads for each of the RFID inventory tags. Position estimates and/or location estimates are derived for each of the RFID inventory tags using the respective intersecting codes, as shown by step 636. The position and/or location estimates are then stored in step 638. The data store in which the position and/or location estimates are stored is internal to and/or external to the handheld reader. In a next step 640, information is output from the handheld reader indicating an estimated position and/or location for at least one RFID inventory tag. Subsequently, step 642 is performed where method 600 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for determining a location of an object within a space, comprising:
   generating inertial reference measurement data by an Attitude and Heading Reference ("AHR") device that is useful for determining an orientation and position of an RFID reader within the space at each of a plurality of RFID tag read times;
   performing operations by the RFID reader to read a plurality of RFID inventory tags one or more times;
   processing the inertial reference measurement data to determine at least RFID reader orientation and position estimates at times of each read of said RFID inventory tags;
   defining a plurality of cones associated with each of said plurality of RFID inventory tags, each cone having a vertex which is the RFID reader position estimate at a respective time of the plurality of RFID tag read times and an angle which is in inverse proportion to a signal strength of a signal received from a respective RFID inventory tag of the plurality of RFID inventory tags;
   mapping the plurality of cones to a model;
   analyzing the model to identify at least one set of cones which overlap each other and are associated with reads for a respective RFID inventory tag of the plurality of RFID inventory tags; and
   deriving a position estimate for the respective inventory tag based on intersecting portions of the cones in the set of cones which was previously identified.

2. The method according to claim 1, further comprising performing operations by the RFID reader to read at least one RFID locator tag one or more times.

3. The method according to claim 2, further comprising correcting errors of the RFID reader position estimate using a known location of an RFID locator tag.

4. The method according to claim 1, wherein each cone of the plurality of cones has an orientation which is the same as the orientation of the RFID reader at the respective time of the plurality of RFID tag read times.

5. The method according to claim 1, wherein the model is a physical model, a mathematical model or a graphical model.

6. The method according to claim 1, further comprising storing the RFID reader orientation and position estimates for the respective RFID inventory tag is a data store internal to or external to the RFID reader.

7. The method according to claim 1, further comprising outputting from the handheld reader information indicating the RFID reader orientation and position estimates for the respective RFID inventory tag.

8. The method according to claim 1, wherein one or more RFID location tags have a strong response within a known range of positions and or orientations relative to the RFID reader antenna and a substantially weaker response outside of the known range.

9. A method for determining a location of an object within a space, comprising:
   generating inertial reference measurement data by an Attitude and Heading Reference ("AHR") device that is useful for determining an orientation and position of an RFID reader within the space at each of a plurality of RFID tag read times;
   performing operations by the RFID reader to read a plurality of RFID inventory tags one or more times;

processing the inertial reference measurement data to determine at least RFID reader orientation and position estimates at times of each read of said RFID inventory tags;

defining a plurality of cones associated with each of said plurality of RFID inventory tags, each cone having a vertex which is the RFID reader position estimate at a respective time of the plurality of RFID tag read times and an angle which is in inverse proportion to a signal strength of a signal received from a respective RFID inventory tag of the plurality of RFID inventory tags;

mapping the plurality of cones to a model;

analyzing the model to identify at least one set of cones which overlap each other and are associated with reads for a respective RFID inventory tag of the plurality of RFID inventory tags;

discarding cones which (a) do not overlap with at least one other cone in the model, (b) have an angle greater than a threshold value, or (c) do not overlap a cone associated with a strongest received signal strength; and deriving a position estimate for the respective inventory tag based on intersecting portions of the cones in the set of cones which was previously identified.

10. A method for determining a location of an object within a space, comprising:

generating inertial reference measurement data by an Attitude and Heading Reference ("AHR") device that is useful for determining an orientation and position of an RFID reader within the space at each of a plurality of RFID tag read times;

performing operations by the RFID reader to read a plurality of RFID inventory tags one or more times;

processing the inertial reference measurement data to determine at least RFID reader orientation and position estimates at times of each read of said RFID inventory tags;

defining a plurality of cones associated with each of said plurality of RFID inventory tags, each cone having a vertex which is the RFID reader position estimate at a respective time of the plurality of RFID tag read times and an angle which is in inverse proportion to a signal strength of a signal received from a respective RFID inventory tag of the plurality of RFID inventory tags;

mapping the plurality of cones to a model;

analyzing the model to identify at least one set of cones which overlap each other and are associated with reads for a respective RFID inventory tag of the plurality of RFID inventory tags;

deriving a position estimate for the respective inventory tag based on intersecting portions of the cones in the set of cones which was previously identified; and refining the position estimate derived for the respective inventory tag using at least one pre-defined rule limiting a valid location for an object to which the respective inventory tag is attached.

11. A system, comprising:

a plurality of RFID inventory tags coupled to objects disposed within a space;

an RFID reader configured to read a plurality of RFID inventory tags one or more times;

an Attitude and Heading Reference ("AHR") device configured to generate inertial reference measurement data that is useful for determining an orientation and position of the RFID reader within the space at each of a plurality of RFID tag read times; and an electronic circuit configured to process the inertial reference measurement data to determine at least an RFID reader orientation and position estimates at times of each read of said RFID inventory tags, define a plurality of cones associated with each of said plurality of RFID inventory tags, each cone having a vertex which is the RFID reader position estimate at a respective time of the plurality of RFID tag read times and an angle which is in inverse proportion to a signal strength of a signal received from a respective RFID inventory tag of the plurality of RFID inventory tags, map the plurality of cones to a model, analyze the model to identify at least one set of cones which overlap each other and are associated with reads for a respective RFID inventory tag of the plurality of RFID inventory tags, and derive a position estimate for the respective inventory tag based on intersecting portions of the cones in the set of cones which was previously identified.

12. The system according to claim 11, wherein the RFID reader further reads at least one RFID locator tag one or more times.

13. The system according to claim 12, wherein the electronic circuit further corrects errors of the RFID reader position estimate using a known location of an RFID locator tag.

14. The system according to claim 11, wherein each cone of the plurality of cones has an orientation which is the same as the orientation of the RFID reader at the respective time of the plurality of RFID tag read times.

15. The system according to claim 11, wherein the model is a physical model, a mathematical model or a graphical model.

16. The system according to claim 11, wherein the orientation and position estimates for the respective RFID inventory tag is stored in a data store internal to or external to the RFID reader.

17. The system according to claim 11, wherein the handheld reader outputs information indicating the orientation and position estimates for the respective RFID inventory tag.

18. The system according to claim 11, wherein one or more RFID location tags have a strong response within a known range of positions and or orientations relative to the antenna of the RFID reader and substantially weaker response outside of the known range.

19. A system, comprising:

a plurality of RFID inventory tags coupled to objects disposed within a space;

an RFID reader configured to read a plurality of RFID inventory tags one or more times;

an Attitude and Heading Reference ("AHR") device configured to generate inertial reference measurement data that is useful for determining an orientation and position of the RFID reader within the space at each of a plurality of RFID tag read times; and an electronic circuit configured to process the inertial reference measurement data to determine at least an RFID reader orientation and position estimates at times of each read of said RFID inventory tags, define a plurality of cones associated with each of said plurality of RFID inventory tags, each cone having a vertex which is the RFID reader position estimate at a respective time of the plurality of RFID tag read times and an angle which is in inverse proportion to a signal strength of a signal received from a respective RFID inventory tag of the plurality of RFID inventory tags, map the plurality of cones to a model, analyze the model to identify at least one set of cones which overlap each other and are associated with reads for a respective RFID inventory tag of the plurality of RFID inventory tags, and derive a position estimate for the respective inventory tag based on intersecting portions of the cones in the set of cones which was previously identified;

wherein the electronic circuit discards cones which (a) do not overlap with at least one other cone in the model, (b) have an angle greater than a threshold value, or (c) do not overlap a cone associated with a strongest received signal strength.

20. A system, comprising:

a plurality of RFID inventory tags coupled to objects disposed within a space;

an RFID reader configured to read a plurality of RFID inventory tags one or more times;

an Attitude and Heading Reference ("AHR") device configured to generate inertial reference measurement data that is useful for determining an orientation and position of the RFID reader within the space at each of a plurality of RFID tag read times; and an electronic circuit configured to process the inertial reference measurement data to determine at least an RFID reader orientation and position estimates at times of each read of said RFID inventory tags, define a plurality of cones associated with each of said plurality of RFID inventory tags, each cone having a vertex which is the RFID reader position estimate at a respective time of the plurality of RFID tag read times and an angle which is in inverse proportion to a signal strength of a signal received from a respective RFID inventory tag of the plurality of RFID inventory tags, map the plurality of cones to a model, analyze the model to identify at least one set of cones which overlap each other and are associated with reads for a respective RFID inventory tag of the plurality of RFID inventory tags, and derive a position estimate for the respective inventory tag based on intersecting portions of the cones in the set of cones which was previously identified;

wherein the electronic circuit refines the position estimate derived for the respective inventory tag using at least one pre-defined rule limiting a valid location for an object to which the respective inventory tag is attached.

* * * * *